United States Patent

Tolar

[15] 3,672,685

[45] June 27, 1972

[54] UNIVERSAL CARTRIDGE-TYPE TAPE RECORDER AND PLAYBACK INSTRUMENT

[72] Inventor: James H. Tolar, Mayfield Heights, Ohio

[73] Assignee: Tenna Corporation

[22] Filed: Jan. 19, 1967

[21] Appl. No.: 610,346

[52] U.S. Cl. ...............274/4 G, 179/100.2 CA, 179/100.2 Z, 226/199, 274/4 A

[51] Int. Cl. ...............G11b 15/29, G11b 21/08, G11b 21/24

[58] Field of Search .........179/100.2 CA, 100.2 MI, 100.2 Z; 274/4, 11; 242/55.13, 55.19, 55.19 A; 226/181, 199, 198, 90

[56] References Cited

UNITED STATES PATENTS

| | | | |
|---|---|---|---|
| 3,481,259 | 12/1969 | Langnau | 95/10 |
| 3,482,839 | 12/1969 | Wolfner | 274/4 G |
| 3,422,740 | 1/1970 | Nerwin | 95/31 |
| 3,337,105 | 8/1967 | Wilson | 276/90 |
| 2,275,961 | 3/1942 | Heller | 179/100.2 |
| 3,388,911 | 6/1968 | Wilson et al. | 274/4 |
| 3,332,596 | 7/1967 | Gash | 242/55.19 |
| 2,938,962 | 5/1960 | Konins et al. | 179/100.2 MI |

*Primary Examiner*—Leonard Forman
*Assistant Examiner*—Dennis A. Dearing
*Attorney*—Baldwin, Egan, Walling & Fetzer

[57] ABSTRACT

A cartridge-type tape player containing three coordinated systems for positioning the transducer with respect to the recording tracks on the tape. The first system is actuated by an operator controlled selector switch to index the transducer to a position adjacent the track or tracks containing the signals to be played. The second system automatically shifts the transducer 0.016 inches with respect to the tape when one type of cartridge which is normally loaded with a four-track prerecorded tape is inserted into the tape player. The third system has a mechanism for "fine tuning" the position of the transducer with respect to the tape by small increments to eliminate crosstalk and distortion caused by the failure of the transducer to come into perfect register with the tracks of the tape. Additionally the tape guide may be adjusted for perfecting the position of the tape with respect to the transducer.

6 Claims, 8 Drawing Figures

INVENTOR.
JAMES H. TOLAR

BY Louis Bernat

ATTY.

INVENTOR.
JAMES H. TOLAR
BY Louis Bernat
Att'y.

UNIVERSAL CARTRIDGE-TYPE TAPE RECORDER AND PLAYBACK INSTRUMENT

This invention relates to improvements in cartridge-type tape recording systems and more particularly to novel means for regulating the position of the transducer with respect to the tape so that optimum transducer performance can be obtained.

Recently, the market for prerecorded magnetic tapes has become very lucrative. These tapes have received a very favorable consumer acceptance because they can be replayed in tape players constructed to accept them without the necessity of manually feeding the tape past the various elements, such as the drive capstan, the transducer and the tape guides, of the tape player and because they can be removed and reinserted without rewinding. These features in particular, coupled with a long recording period and a cartridge construction which prevents the tape from unspooling if it is mishandled, make these cartridges and their compatible players popular accessories for use in automobiles and in other environments where it is not practical for the operator to devote much attention to the mechanical operation of the tape player.

Because of the big demand for prerecorded tape cartridges, a large number of new organizations have entered the market to offer prerecorded tape cartridges to the public. Many of these newcomers lack the technical facilities required to produce high quality tapes. As a result, the public has purchased a large number of cartridges which are defective in one or more details. The most common defects are the errors in the dimensions of the cartridge, particularly in the vicinity of where the tape meets the transducer, errors in the dimensions of the tape, improper location and level of tape guides and improper recording track formats which differ from established industry standards.

With tape players of the prior art, it was not possible to achieve optimum reproduction quality from substandard cartridges because the defects prevented the tracks on the tape from attaining perfect register with the transducer. If an eight track, prerecorded tape is shifted as little as 0.004 inches from perfect register, the quality of the reproduced signal is degraded to the point of being unacceptable.

Because of the presence of substandard cartridges on the market and because of the difficulty of maintaining tape-transducer register tolerances of less than 0.004 inches even with high quality equipment when the cartridges, tapes and players are subjected to extremes in temperature, humidity, dust and mechanical stress, shock and long wear, it is necessary to provide some means for maintaining high reproduction quality even when the tape player is subjected to the most adverse conditions. This feature is particularly important in a tape player constructed to be compatible with all of the popular cartridges, such as the Universal Tape Player disclosed in copending Patent application Ser. No. 561,635, filed June 29, 1966.

Accordingly, it is a principal object of this invention to provide a novel transducer-tape positioning system which can compensate for defects in tapes and cartridges arising out of extreme environmental conditions, long wear or poor manufacturing quality.

In addition to providing a tape-transducer positioning system for a tape player which can compensate for changes in the relative position between the tape and the transducer, it is also another principal object of this invention to provide a positioning system for a tape player which will make the tape player compatible with new recording track patterns which may be adopted in future industry standards.

Presently, one type of cartridge is sold only with four-track prerecorded tape while another cartridge of different design, marketed by a competing manufacturer, is sold with only eight-tract prerecorded tape. The eight-track tapes are expected to become more popular than the four-track tapes because they have a longer playing time. It is expected that those manufacturers now supplying cartridges with four-track tapes will eventually offer eight-track tapes in cartridges now containing four-track tapes. These new eight-track tapes may or may not have the same track format as the eight-track tapes now presently being offered. Because it is desirable to make new tape players compatible with any new recording track format, the tape-transducer positioning system of this invention contains means for positioning the transducer with respect to a tape having any recording format to obtain optimum signal reproduction quality and to minimize crosstalk between signals on different tracks caused by the transducer picking up two or more signals recorded on different tracks.

These and other objects, features and advantages of the invention will become more readily apparent in the following description of preferred embodiments taken in conjunction with the accompanying drawings in which.

Figure 1:
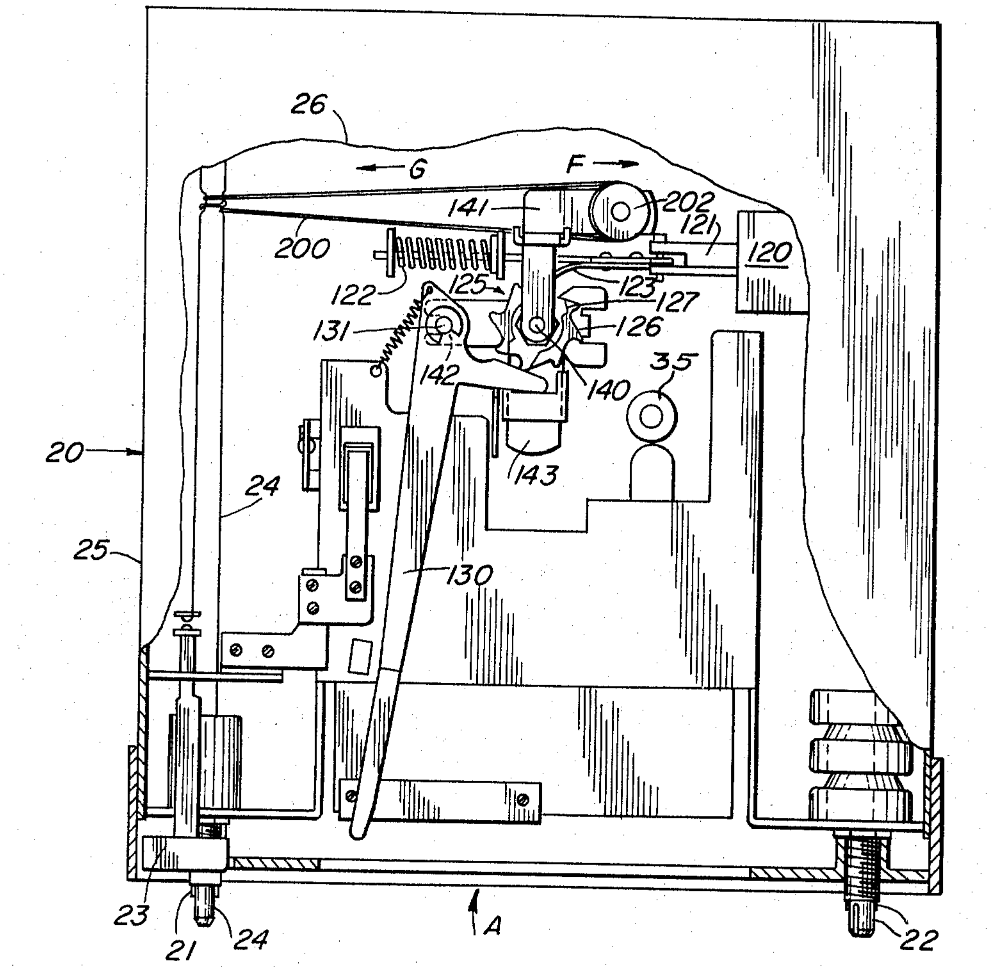
FIG. 1 is a top plan view of a Universal Tape Player incorporating the system of this invention.

Referring to FIG. 1, the Universal Cartridge-Type Tape Player 20 has a volume control 21, a combination tone and balance control 22, pushbutton 23 for selecting the tracks to be reproduced and a control shaft 24 mounted in combination with the volume control 21 for operating the transducer-tape positioning system to be described below. These controls are located on the front of a housing 25 which encloses the tape player mechanism. The housing is shown broken away along line 26 for the purpose of illustrating the components of the system contained in the illustrated embodiment of this invention. For the same reason, the front escutcheon is not shown in the front elevation view of the tape player in FIG. 2.

The interior of the housing 25 is horizontally divided into an upper part 30 and a lower part 31 by a base plate 32. The cartridge containing the tape to be played and the operating controls are located in the upper part 30 while motor 33, mechanical drive 34 and other parts to be described are located in the lower part 31.

In order to play a tape, the operator inserts the cartridge containing the tape into a guideway or cartridge receiving means having a height 36 and a width 37. The arrow A in FIG. 1 indicates the direction in which the cartridge moves when it is inserted into the tape player.

Figure 2:
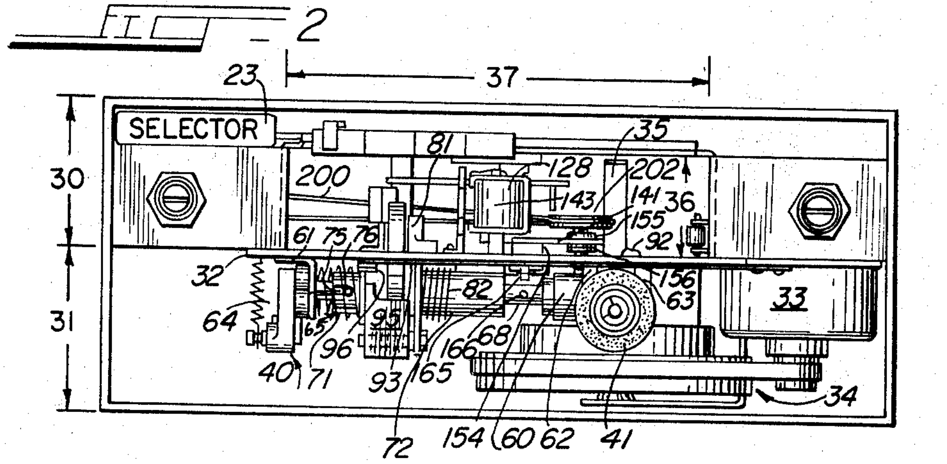
FIG. 2 is a front elevation of the Universal Tape Player of FIG. 1.

As explained in greater detail in copending Patent application Ser. No. 561,635 filed June 29, 1966, toggle mounting 40, shown in FIG. 2, is used to flip pinch roller 41 from a non-operating first position to an operating second position when one type of cartridge requiring the insertion of a pinch roller for holding the tape against tape drive capstan 35 is placed in the cartridge receiving means. More particularly, this mounting includes a rotatable shaft assembly 60 mounted in bearings on a bracket 61 and a pair of pillow blocks 62 and 63. The toggle action is caused by over-center spring and lever mechanism 64. When engaged by a mechanism which senses whether the cartridge inserted in the receiving means requires a pinch roller, a dog clutch 65 causes the pinch roller to flip up from a first operating position outside the guideway to a second position inside the guideway within a cartridge having an opening for the insertion of the pinch roller.

In the preferred embodiment, the pinch roller 41 is a rubber-surfaced wheel journaled on the end of an arm which extends perpendicularly from the shaft assembly 60. The arm and the shaft turn as a unit. The shaft 60 includes a section 68 of reduced diameter which rigidly interconnects the pinch roller mounting section and the toggle spring and lever mechanism 64.

The clutch 65 contains two concentrically mounted, axially aligned sleeve members 71 and 72 loosely fitting on the shaft 60. The adjacent faces of these members include complementary contours of the dog clutch. One half of the clutch, the sleeve member 71, has a guideway 75 formed to cooperate with a pin 76 running through the shaft section 68.

The other half of the clutch, the sleeve member 72, includes an integral operating arm 81 which is positioned in the guideway that receives the cartridge. As the cartridge is pushed into its playing position, the arm 81 rotates the clutch member 72 and winds up a yield spring 82. If the cartridge is removed from the guideway, the spring 82 unwinds and forces the operating arm 81 back ot its rest position.

An actuator or sensing control device selectively operates the clutch 65 according to whether certain physical characteristics of the cartridge are sensed as the cartridge is inserted into the guideway. If the cartridge does not have a hole through which the pinch roller 41 can pass, sensing finger 92 will be forced downward by the floor of the cartridge, thereby causing spring 93 to bend so that its hooked end 96 engages the end of clutch release 95. If the hooked end engages the end of clutch release 95, the clutch release will be prevented from rotating and a segmented tab will remain in front of the spring-biased clutch member 71 which will prevent the clutch member 71 from engaging the clutch member 72. Because the clutch members 71 and 72 will not engage, the shaft 60 will not turn and the pinch roller will remain in the position shown in FIG. 2.

If an opening for the pinch roller 41 is present, the sensing finger 92 will not cause the spring 93 to bend so that the hooked end 96 will not engage the end of the clutch release 95 as a cartridge is inserted. The clutch release 95 will be free to rotate and the segmented tab will move away from the clutch member 71 thereby allowing it to engage the clutch member 72 to cause the shaft 60 to rotate the pinch roller by 90° into the cartridge.

In addition to having means for inserting the pinch roller 41 into cartridges which require it, the tape player also contains a mechanism for raising or lowering transducer 143 with respect to the tape to select the track or tracks on the tape containing the signals to be reproduced.

Figure 3:
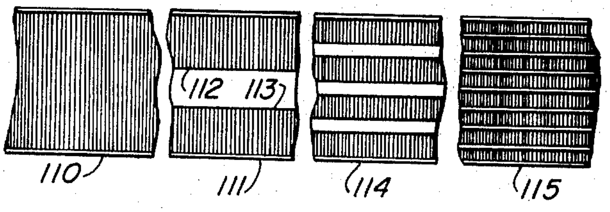
FIG. 3 is an illustration of four segments of magnetic tape, each having one of four most popular recording formats.

As shown in detail in FIG. 3, a tape segment 110 may have a single recorded track approximately as wide as the tape. The transducer may be positioned at any level or elevation within the boundaries of the track to obtain optimum reproduction because there is no possibility of crosstalk. However, if the tape 111 has two tracks, the transducer must be positioned up or down so that it comes into register with only one of the tracks 112 or 113. If the transducer is positioned so that it responds to signals on both tracks, the condition of crosstalk develops which produces a degraded signal. In a similar fashion, tape segment 114 contains four tracks and tape segment 115 contains eight tracks.

Three independently operated but cooperating systems are used to position the transducer 143 to the correct level with respect to the tape to reproduce the desired signals from all of the signals recorded on different tracks on the tape. The first system allows the operator to grossly position the transducer to points adjacent the desired tracks so that he can choose the portions of the recordings he wishes to hear. The second system automatically shifts the relative transducer-tape position by 0.016 inches when a four-track prerecorded tape cartridge is inserted in the player. The third system provides means for "fine-tuning" the transducer to correct for deviations in transducer-track register caused by worn or defective cartridges or tapes, changes in guideway dimensions caused by wear, shock or temperature extremes, or new or non-standard track formats.

In the first system, a solenoid 120 is actuated by the selector switch 23 for operating an index wheel 125, journaled from a transducer support plate 141, in a rotAry, step-by-step manner. As the index wheel rotates, a vertical cam 128 on its bottom positions the transducer 143 against the force of a spring biased against the chassis. A horizontal cam 127 on the top of the index wheel moves an indicator 130 to provide a visual indication of which tracks the transducer 143 is positioned near.

When the solenoid 120 is energized, its armature 121 pulls in the direction indicated by the arrow F. When the solenoid is de-energized, spring 122 pushes the armature in the direction indicated by the arrow G. Mounted on the armature 121 is a pawl 123 which engages the teeth of the ratchet wheel 126 formed in the index wheel 125.

The lower or vertical cam surface 128 on the index wheel 125 controls the elevation of the transducer 143. In greater detail, an arm 138 having an upstanding tab 139 is mounted to slide up and down on shaft 140. A spring biases the arm 138 upward. The opposite end of the arm 138 has a generally bifurcated section 142 surrounding shaft 131 so that the arm 138 cannot rotate. The end of the arm 138 is connected to the transducer 143 as shown in FIGS. 1 and 2. Thus by operating selector switch 23, the transducer 143 may be positioned to any one of the plurality of discrete levels with respect to the tape.

Figure 4:
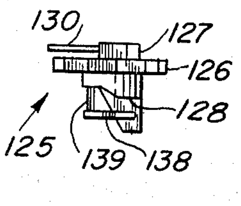
FIGS. 4–6 are three stop motion views showing how an index wheel is operated to control the gross position of a transducer with respect to recorded tape in the Tape Player of FIGS. 1 and 2.
Figure 5:
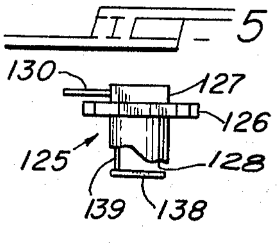
Figure 6:
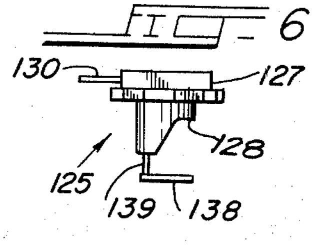

The actual contours of the vertical cam surfaces are shown in FIG. 2; however, to better illustrate the operation of the system, the cam surfaces are shown in a somewhat exaggerated scale in FIGS. 4–6.

As the selector switch 23 is operated, the index wheel 125 is stepped to a new position which, in turn, causes the tab 139 to contact successive vertical cam segments, thereby changing the position of the transducer 143 from one discrete level to another. In this manner the signals from any desired track may be reproduced.

In addition to moving the transducer to replay different signals located on different tracks, it is also necessary to shift the position of the transducer with respect to the tape by .016 inches to compensate for the difference in location between the centers of the tracks on four-track and eight-track tapes. Referring to FIG. 3, it will be noted that if the transducer were not raised from the proper four-track position when eight-track is being replayed, the transducer would detect signals on two adjacent tracks. This would create the crosstalk condition previously described as being undesirable.

The automatic shifting of the transducer by 0.016 inches to compensate for the differences in track formats on four-track and eight-track tape is accomplished by the second transducer positioning system. At present four-track tapes are sold only in cartridges requiring a pinch roller whereas eight-track tapes are sold only in cartridges which cannot accommodate a pinch roller. The second system is operated in response to the pinch roller actuation control assembly, previously described, which contains means for determining the type of cartridge inserted in the guideway.

In greater detail, this system is best seen in FIG. 2 as including an arm 154 extending from the transducer support plate 141, a hinged lever 165, and a lever pin 166 affixed to the shaft 68.

When the pinch roller 41 is in the position shown in FIG. 1, the position for an eight-track cartridge which does not accept a pinch roller, the transducer plate 141, and therefore the transducer 143, is biased by a spring to its highest level with the upper surface of the base of the plate 141 resting against the upper edge of the axial, circumferential slot in head 155 of adjustment screw 156 threaded through the chassis.

When the pinch roller is flipped up for a four-track cartridge which accepts a pinch roller, the lever pin 166 is forced against one end of the hinged lever 165 which in turn causes the other end of the lever 165 to push against the arm 154 to cause the support plate to drop 0.016 inches until the lower surface of its base rests against the lower edge of the slot in the head 155. The width of the slot is precisely cut so that it is 0.016 inches wider than the width of the base of plate 141 so that the change in head position is precisely limited to 0.016 inches.

The third system for controlling the position of the transducer comprises a means for "fine-tuning" the level of the transducer to eliminate crosstalk between different tracks and to optimize the quality of the reproduced signals.

When the operator hears a degraded signal, he may fine-tune the transducer by turning control shaft 24 mounted in combination with the volume control 21. Rotating the control shaft 24 causes a dial string 200 to turn a pulley 202 fixed to the adjustment screw 156. As the screw 156 is threaded into the chassis, turning the pulley 202 causes the slot in the head 155 to move up or down according to the direction in which the control shaft 24 is rotated. As movement of the transducer through a distance as small as 0.004 inches is often enough to correct distortion, the gearing or mechanical advantage of the means for transmitting the motion of the operating control, here the rotary motion of the control shaft 24, to the adjustment screw or other means for changing the level of the transducer by small increments is chosen so that moderate changes in control position produce small increments in the change of transducer. Thus a composite "gear ratio" or mechanical advantage of about 100:1 is desirable in order that the operator need not find that great skill is required to make a critical adjustment. In the illustrated embodiment, the overall gear ratio was determined by the proper selection of the pitch of the adjustment screw 156, and the ratio of the diameter of the pulley 202 to the diameter of the control shaft 24.

In addition to control shafts such as the one shown, other types of operator controls such as thumb wheels and sliding levers are practical. Further, a number of substitute drive means can be used in place of the control shaft, the dial string and the pulley. Meshed gears, chains and sprockets and servo-type electrical controls may be more desirable in certain applications.

Although the illustrated embodiment contains an adjustment screw threaded into the chassis for regulating the position of the transducer with respect to the tape, other means for moving the transducer by small increments are also feasible. Thus, the transducer support plate might form one side of a parallelogram, the angles of which could be controlled to change the level of the transducer.

Figure 7:
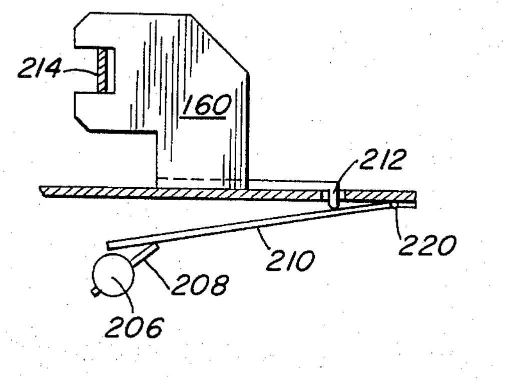
FIGS. 7 and 8 are two side views of a tape guide assembly regulating the level of the recording tape relative to a transducer head in a second embodiment of the invention.
Figure 8:
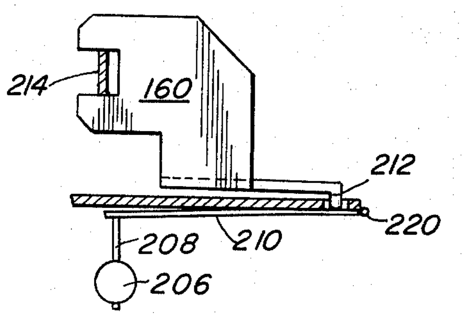

In addition to moving the transducer, it is also practical to move the tape up or down by small increments by changing the level of the tape guides through which the tape passes. Referring to FIGS. 7 and 8, a tape guide 160 is slidably secured to the chassis so that it can move up or down. Shaft 206, driven by an operator control such as the control shaft 24, may be rotated so that pin 208 pushes lever 210 up to force tab 212 to raise the tape guide pin 160 containing the tape 214. The overall mechanical advantage of this system is easily determined and controlled by properly choosing the distances between the pin 208, the tab 212 and the hinge 220.

This embodiment of the invention incorporating movable tape guides may be especially useful for incorporating this invention into existing tape players where it is not possible or economical to change the construction of the transducer positioning mechanisms.

The advantages of incorporating this invention into tape players, and particularly tape players designed to be compatible with several different types of cartridges and tapes, are easily appreciated. This invention makes it possible for the owner of the tape player to keep his instrument in optimum operating condition in any environment without regard to the condition or quality of his tapes and cartridges. Further, it insures him that his tape player will always be compatible with any new tape recording track format that may be introduced in the future. Thus, if and when eight-track prerecorded tape is offered in cartridges now containing four-track tape, he need only turn the control shaft to reposition either or both the transducer and the tape guide by 0.016 inches to obtain optimum fidelity. Because of this improvement, the owner need not fear that his player will become obsolete or will not be compatible with new recorded tapes having different formats from those now being sold.

The invention has been described in reference to two embodiments chosen for illustration because of their structural simplicity when incorporated in the Universal Tape Player described in the above-identified copending Patent Application. Because of the many variations in the construction of tape recorders and players, it is to be expected that this invention can be practiced with a number of modifications of the preferred embodiments which, while structurally different, are nevertheless within the spirit and scope of the invention.

WHAT IS CLAIMED IS:

1. A cartridge-type player com-prising:
   a. means for receiving a cartridge loaded with recording tape;
   b. a transducer supported adjacent to the cartridge receiving means for transducing signals located in tracks on recording tape loaded in a cartridge which is inserted into the receiving means;
   c. means for pulling the tape past the transducer when a cartridge is inserted into the receiving means;
   d. means for selecting the track containing the signals which are desired to be reproduced by positioning the transducer to one of a plurality of discrete levels;
   e. independent toolless tuning means manually controllable by the operator from the front of the tape player during normal playback for selectively and precisely adjusting the position of the transducer within the discrete track level selected by said selecting means in order to obtain optimum transducing performance; the means for adjusting the position of the transducer with respect to the tracks comprising:
   manually operable means for changing the relative position of the transducer with respect to the tracks by small increments to obtain optimum transducing performance by minimizing crosstalk between signals on different tracks; the manually operable means comprising:
   a panel-mounted operator control; the manually operable means for changing the relative position of the transducer with respect to the tracks by small increments comprising:
   a. a tape guide adjacent the transducer; and
   b. means for changing the level of the tape guide by small increments in response to the operation of the panel-mounted control.
2. A cartridge-type tape player comprising:
   a. means for receiving any one of a plurality of different types of cartridges loaded with recording tape, one type containing means for holding the tape against a capstan and another type requiring the insertion of such a holding means;
   b. a transducer supported adjacent to the cartridge receiving means for transducing signals located in tracks on recording tape loaded in a cartridge which is inserted into the receiving means, the positions of said tracks being different for said different types of said cartridges;
   c. means for pulling the tape past the transducer when a cartridge is inserted into the receiving means comprising:
   d. a tape driven capstan positioned adjacent the receiving means for pulling the tape through the cartridge when the tape is pressed against the capstan;
   e. sensing means associated with the cartridge receiving means for determining whether the cartridge requires the insertion of means for holding the tape against the capstan for proper operation;
   f. means for holding the tape against the capstan for cartridges which require holding means to be inserted;
   g. means for inserting holding means into a cartridge placed in the receiving means when the sensing means determine that the cartridge requires the insertion of holding means;
   h. means for selecting the track containing the signals which are desired to be reproduced by positioning the transducer to one of a plurality of discrete levels;

i. independent manually operable toolless means operable from the front of the tape player for changing the relative position of the transducer with respect to the tracks to adjust the transducer position by small increments to obtain optimum transducing performance by minimizing cross-talk between signals on different tracks; and j. automatic means responsive to the sensing means for determining the relative position between the transducer and the tape when a cartridge is inserted into the receiving means; the holding means comprising:

a pinch roller;

the means for inserting holding means comprising:

a toggle mount for the pinch roller having a first position outside the receiving means and a second position inside the receiving means;

the sensing means comprising:

means for flipping the pinch roller into a second position within the cartridge when the sensing means determine that the other type of cartridge is present which contains an opening for the insertion of the pinch roller into the cartridge;

the automatic means for determining the relative position between the transducer and the tape comprising:

means for changing the relative position of the transducer with respect to the tape, said change being from a first level associated with said one type of cartridge to a second level associated with said other type of cartridge when the pinch roller is flipped from the first position to the second position;

the manually operable means for changing the relative position of the transducer with respect to the tracks by small increments comprising:

a'. means for supporting the transducer adjacent the tape when a cartridge is inserted in the receiving means including 1. a support plate for supporting the transducer, and
2. a screw rotatably secured near one end to the plate and the other end rotatably secured to the tape player chassis; and b'. manually operable drive means for rotating the screw to regulate the level of the support plate and the transducer with respect to the tracks on the tape;

one end of the screw being threaded into the tape player chassis and comprising in addition:

a head fixed to the screw near the other end, the head containing an axial, circumferential slot defined by upper and lower surfaces, portions of which enclose a portion of the support plate.

3 The tape player of claim 2 wherein the manually operable drive means comprise:

mechanical means for transmitting rotary motion from panel-mounted knob to the screw.

4. A cartridge-type tape player comprising:

a. means for receiving any one of a plurality of different types of cartridges loaded with recording tape, one type containing means for holding the tape against a capstan and another type requiring the insertion of such a holding means;

b. a transducer supported adjacent to the cartridge receiving means for transducing signals located in tracks on recording tape loaded in a cartridge which is inserted into the receiving means, the positions of said tracks being different for said different types of said cartridges;

c. means for pulling the tape past the transducer when a cartridge is inserted into the receiving means comprising;

d. a tape drive capstan positioned adjacent the receiving means for pulling the tape through the cartridge when the tape is pressed against the capstan;

e. sensing means associated with the cartridge receiving means for determining whether the cartridge requires the insertion of means for holding the tape against the capstan for proper operation;

f. means for holding the tape against the capstan for cartridges which require holding means to be inserted;

g. means for inserting holding means into a cartridge placed in the receiving means when the sensing means determine that the cartridge requires the insertion of holding means;

h. means for selecting the track containing the signals which are desired to be reproduced by positioning the transducer to one of a plurality of discrete levels;

i. independent manually operable toolless means operable from the front of the tape player for changing the relative position of the transducer with respect to the tracks to adjust the transducer position by small increments to obtain optimum transducing performance by minimizing cross-talk between signals on different tracks; and j. automatic means responsive to the sensing means for determining the relative position between the transducer and the tape when a cartridge is inserted into the receiving means; the holding means comprising;

a pinch roller;

the means for inserting holding means comprising:

a toggle mount for the pinch roller having a first position outside the receiving means and a second position inside the receiving means;

the sensing means comprising:

means for flipping the pinch roller into a second position within the cartridge when the sensing means determine that the other type of cartridge is present which contains an opening for the insertion of the pinch roller into the cartridge; and the automatic means for determining the relative position between the transducer and the tape comprise:

means for changing the relative position of the transducer with respect to the tape, said change being from a first level associated with said one type of cartridge to a second level associated with said other type of cartridge when the pinch roller is flipped from the first position to the second position;

the manually operable means for changing the relative position of the transducer with respect to the tracks comprising:

a tape guide for maintaining the position of the tape relative to the transducer; and means for manually moving the tape guide to regulate the level of the tape with respect to the transducer.

5 The tape player of claim 4 wherein the means for manually moving the tape guide comprise:

a. means for raising or lowering the level of the tape guide relative to the transducer having a rotatable control shaft to control the amount by which the level is changed; and b. mechanical means for transmitting rotary motion from a panel-mounted, manually operable knob to the control shaft.

6. A universal cartridge-type tape player comprising:

a. means for receiving either one of two different types of magnetic tape cartridges one of which is provided with a hole for allowing a pinch roller to enter the cartridge;

b. a capstan positioned adjacent the cartridge receiving means for pulling magnetic tape through the cartridge when the tape is pressed against the capstan;

c. sensing means associated with the cartridge receiving means for determining whether a cartridge inserted in the receiving means contains a hole for allowing a pinch roller to enter the cartridge;

d. selectable drive means responsive to the sensing means for holding the tape against the capstan containing:

1. a pinch roller,
2. a toggle mount for the pinch roller having a first position outside the receiving means and a second position inside the receiving means, and
3. means for flipping the pinch roller into the second position within the cartridge when the sensing means determine that the cartridge in the receiving means contains an opening for the insertion of the pinch roller into the cartridge;

e. a transducer support plate slidably secured to the tape player chassis;

f. a magnetic recording transducer slidably secured to the support plate;

g. a rotary mounted index wheel having an axially indexed cam surface, the wheel being mounted between the transducer and the support plate;

h. means riding on the cam surface for selectively raising or lowering the transducer, relative to the tape and the support plate, responsive to the rotary position of the wheel;

i. a ratchet wheel on the index wheel for selecting the rotary position of the cam surface;

j. solenoid controlled means cooperative with the ratchet wheel for rotating the the indexing wheel in a step-by-step manner;

k. manually operable means for regulating the relative level between the tape and the transducer incorporating 1. a screw containing a head near one end having a circumferential axial slot and threaded into the chassis at the other end, the support plate being slidably retained within the slot,
2. a manually operable, panel-mounted knob, and
3. mechanical means for transmitting rotary motion from the knob to the screw for rotating the screw to cause the level of the slot with respect to the chassis to change when the knob is manually rotated; and l. automatic means responsive to the sensing means for changing the level of the transducer relative to the tape when a cartridge is inserted in the receiving means including means for moving the transducer from a first level associated with one type of cartridge to a second level associated with the other type of cartridge when the pinch roller is flipped from the first position to the second position, the distance between the levels being determined by the difference between the axial width of the slot and the thickness of the support plate in the slot.

* * * * *